United States Patent
Gerhard-Rieben et al.

[11] Patent Number: 5,897,903
[45] Date of Patent: Apr. 27, 1999

[54] COFFEE EXTRACTION PROCESS

[75] Inventors: Elke Gerhard-Rieben, Le Mont sur Lausanne; Claude René Lebet, Charvonay; Valérie Leloup, Lausanne; Klaus Schlecht, Orbe, all of Switzerland

[73] Assignee: Nestec S.A., Vevey, Switzerland

[21] Appl. No.: 08/906,617

[22] Filed: Aug. 5, 1997

[30] Foreign Application Priority Data

Aug. 26, 1996 [EP] European Pat. Off. ............... 96202356

[51] Int. Cl.⁶ .......................................................... A23F 5/00
[52] U.S. Cl. ............................ 426/433; 426/434; 426/595
[58] Field of Search ................................. 426/595, 433, 426/434

[56] References Cited

U.S. PATENT DOCUMENTS

| | | | |
|---|---|---|---|
| 2,282,138 | 5/1942 | Kellogg | 99/71 |
| 2,410,157 | 10/1946 | Fredrickson | 99/71 |
| 2,888,349 | 5/1959 | Morrow et al. | 426/434 |
| 3,089,772 | 5/1963 | Bowden et al. | 426/434 |
| 3,529,968 | 9/1970 | Hair et al. | 426/434 |
| 3,700,466 | 10/1972 | Bergeron et al. | 426/434 |
| 4,158,067 | 6/1979 | Wouda | 426/432 |
| 4,798,730 | 1/1989 | Scoville et al. | 426/432 |
| 5,151,287 | 9/1992 | Schlecht et al. | 426/434 |
| 5,183,676 | 2/1993 | Schlecht | 426/434 |
| 5,242,700 | 9/1993 | Schlecht | 426/387 |

FOREIGN PATENT DOCUMENTS

| | | | |
|---|---|---|---|
| 0 363 529 | 4/1990 | European Pat. Off. | |
| 0 489 401 | 6/1992 | European Pat. Off. | |
| 0 544 008 | 8/1993 | European Pat. Off. | |
| 877522 | 9/1961 | United Kingdom | 426/434 |
| 2005126 | 4/1979 | United Kingdom | |

*Primary Examiner*—Anthony J. Weier
*Attorney, Agent, or Firm*—Pennie & Edmonds LLP

[57] ABSTRACT

A process for the counter-current extraction of soluble coffee solids. Soluble coffee solids are extracted from roast and ground coffee in a first extraction stage using a primary extraction liquid at a temperature of 80° C. to 160° C. Then soluble coffee solids are extracted from the partially extracted grounds in a second extraction stage using a secondary extraction liquid at a temperature of 160° C. to 190° C., the coffee grounds having at least 25% by weight of soluble coffee solids extracted from them. The coffee grounds obtained from the second extraction stage are drained and thermally hydrolyzed in a hydrolysis stage at a temperature of 160° C. to 220° C. for 1 to 15 minutes. Soluble coffee solids are extracted from the hydrolyzed coffee grounds in a third extraction stage using a tertiary extraction liquid at a temperature of 170° C. to 195° C. to provide extracted coffee grounds and a hydrolyzed coffee extract.

18 Claims, 3 Drawing Sheets

COFFEE EXTRACTION PROCESS

FIELD OF THE INVENTION

This invention relates to a process for the production of a soluble coffee product which contains hydrolyzed coffee solids. The invention also relates to a soluble coffee product which contains hydrolyzed coffee solids.

BACKGROUND TO THE INVENTION

For most consumers, the ideal coffee beverage is prepared by brewing roasted and freshly ground coffee beans with hot water; usually at a temperature of 90° C. to 100° C. However, since these conditions produce yields of soluble coffee solids of less than 25%, it is not commercially viable to produce soluble coffee products under these conditions. Therefore most recent technological developments made in the soluble coffee field concern attempts to simulate this ideal coffee beverage while obtaining a viable yield.

Early attempts to raise the yield of soluble coffee solids centered on increasing the temperature and pressure of the extraction liquid used to extract the coffee solids from the roast and ground coffee. However it was soon found that, to reach acceptable yields, the temperatures and pressures needed to be sufficiently high such that extensive hydrolysis occurred in the extraction system. This is undesirable since it results in the production of tars, which cause fouling, and off-flavors.

Attention then turned to subjecting roast and ground coffee to extraction under relatively mild conditions and, separately, subjecting the partially extracted grounds to hydrolysis to increase the yields. In this way, the problem of off-flavors could be reduced to acceptable levels. For example, U.S. Pat. No. 4,158,067 (Wouda) discloses a process in which roast and ground coffee is subjected to counter-current extraction in two stages with a separate hydrolysis stage between the two extraction stages. Hot water at 60° C. to 120° C. is introduced into the second extraction stage while fresh roast and coffee is introduced into the first extraction stage. The extraction liquid leaving the second extraction stage is introduced into the first extraction stage to extract the fresh roast and ground coffee. The partially extracted coffee grounds leaving the first extraction stage are subjected to thermal hydrolysis at a temperature of 140° C. to 200° C. in a separate hydrolysis stage before being introduced into the second extraction stage. In this way, hydrolyzed coffee solids which are extracted in the second extraction stage do not pass through the hydrolysis stage and do not undergo any further extreme conditions. The production off-flavors and tars which otherwise might have resulted, are reduced.

A further development of this concept is disclosed in European patent 0363529 (Kraft General Foods). In the process described in this patent, the partially extracted coffee grounds obtained from a first extraction stage are slurried and then subjected to hydrolysis at a temperature of 200° C. to 260° C. The hydrolysis is carried out for 1 to 15 minutes in order to remove at least 50% of any mannans and to produce a hydrolysate containing less than 50% monosaccharides and less than 10% of polysaccharides which contain more than 6 saccharides in the polysaccharide chain. The hydrolysate is then added to the coffee extracts obtained from extraction stages.

Although this process is described to provide good yields, reasonably large amounts of saccharides of shorter chains and lower molecular weights are produced. This significantly alters the taste and mouthfeel of beverages produced from the resulting soluble coffee products. Certainly, the flavor profile no longer matches that of brewed coffee. Also, the increased amount of saccharides of smaller chains causes the extract obtained from this process to behave differently, when compared to standard extracts, during concentration and drying. In particular, the extract has a lower freezing point which makes freeze-drying more difficult while stickiness becomes a problem during, spray-drying. Further, the stability during storage of coffee powders produced from the extract is reduced due to enhanced hygroscopicity and lower glass transition temperatures. The extent of the problem is of course dependant on the severity of the hydrolysis treatment.

Therefore there is still a need for a process for extracting soluble coffee solids which has good yields and which provides a soluble coffee product having saccharides of higher molecular weight. There is also a need for a soluble coffee product which contains hydrolyzed coffee solids and saccharides of higher molecular weight.

SUMMARY OF THE INVENTION

Accordingly, in one aspect, this invention provides a process for the counter-current extraction of soluble coffee solids from coffee grounds, the process comprising:

extracting soluble coffee solids from fresh coffee grounds in a first extraction stage using a primary extraction liquid at a temperature of about 80° C. to 160° C. to provide a primary coffee extract and partially extracted grounds;

extracting soluble coffee solids from the partially extracted grounds in a second extraction stage using a secondary extraction liquid at a temperature of about 160° C. to about 190° C. to provide a secondary coffee extract and coffee grounds, the coffee grounds having at least about 25% by weight of soluble coffee solids extracted from them based on the weight of dry roast and ground coffee, the secondary coffee extract being collected or being used as the primary extraction liquid;

draining the coffee grounds obtained from the second extraction stage and thermally hydrolyzing them in a hydrolysis stage at a temperature of about 160° C. to about 220° C. for about 1 to about 15 minutes to provide hydrolyzed coffee grounds; and extracting soluble coffee solids from the hydrolyzed coffee grounds in a third extraction stage using a tertiary extraction liquid at a temperature of about 170° C. to about 195° C. to provide extracted coffee grounds and a hydrolyzed coffee extract, the hydrolyzed coffee extract being collected or being used as the primary or secondary extraction liquid.

Surprisingly, given that hydrolysis takes place, a soluble coffee product may be produced which has a good aroma and flavor profile and which contains a distribution of polysaccharides which more closely resembles that produced by processes in which little or no hydrolysis takes place. Further, good yields in the range of about 45 to about 70% may be obtained. It is also found that little or no sediments or tars are produced. Further, the coffee extract obtained from the process may be freeze-dried or spray-dried without the problems associated with hydrolyzed extracts. Moreover, coffee powders obtained from the coffee extract have good storage stability.

Preferably, the primary extraction liquid enters the first extraction stage at a temperature in the range of about 110° C. to about 140° C. The secondary extraction liquid preferably enters the second extraction stage at a temperature in the range of about 165° C. to about 180° C. The tertiary extraction liquid preferably enters the third extraction stage at a temperature in the range of about 175° C. to about 190° C.

In the hydrolysis stage, the coffee grounds are preferably thermally hydrolyzed at a temperature of about 190° C. to about 210° C. Further, the coffee grounds are preferably thermally hydrolyzed by heating the coffee grounds using steam. The coffee grounds are preferably drained by forcing steam downwardly through them.

Preferably, the hydrolyzed coffee extract contains less than about 1% by weight furfural derivatives, between about 1% and about 6% by weight monosaccharides and more than about 28% by weight of oligosaccharides and polysaccharides; all percentages being based upon the dry matter of the hydrolyzed coffee extract. Further, the weighted average molecular weight of all saccharides in the hydrolyzed coffee extract is preferably higher than about 1500 units with a polydispersity of about 2.5 or higher.

The process may further comprise:

draining the coffee grounds obtained from the third extraction stage and thermally hydrolyzing them in a second hydrolysis stage at a temperature of about 160° C. to about 220° C. for about 1 to about 15 minutes to provide secondary hydrolyzed coffee grounds; and extracting soluble coffee solids from the secondary hydrolyzed coffee grounds in a fourth extraction stage using a fourth extraction liquid at a temperature of about 170° C. to about 195° C. to provide extracted coffee grounds and a hydrolyzed coffee extract, the hydrolyzed coffee extract being collected or being used as the primary, secondary, or tertiary extraction liquid.

In another aspect, this invention provides a soluble coffee product which contains hydrolyzed soluble coffee solids, the soluble coffee product containing at least about 30% by weight of saccharides comprising less than about 1% by weight of furfural derivatives, less than about 4% by weight of monosaccharides, less than about 12% by weight of oligosaccharides, and at least about 18% by weight of polysaccharides, the total saccharides having a weighted average molecular weight of greater than about 2000 units with a polydispersity of about 3 or higher.

Preferably, the soluble coffee product contains more than about 31% by weight of saccharides. The saccharides preferably comprise less than about 0.6% by weight furfural derivatives, about 1 to about 4% by weight monosaccharides, about 2 to about 8% by weight of oligosaccharides, and more than about 23% by weight polysaccharides. Further, the saccharides preferably have a weighted average molecular weight of greater than about 2200 units with a polydispersity of about 3.5 or higher.

BRIEF DESCRIPTION OF THE DRAWINGS

Embodiments of the invention are now described, by way of example only, with reference to the drawings in which.

DETAILED DESCRIPTION OF THE INVENTION

Figure 1:
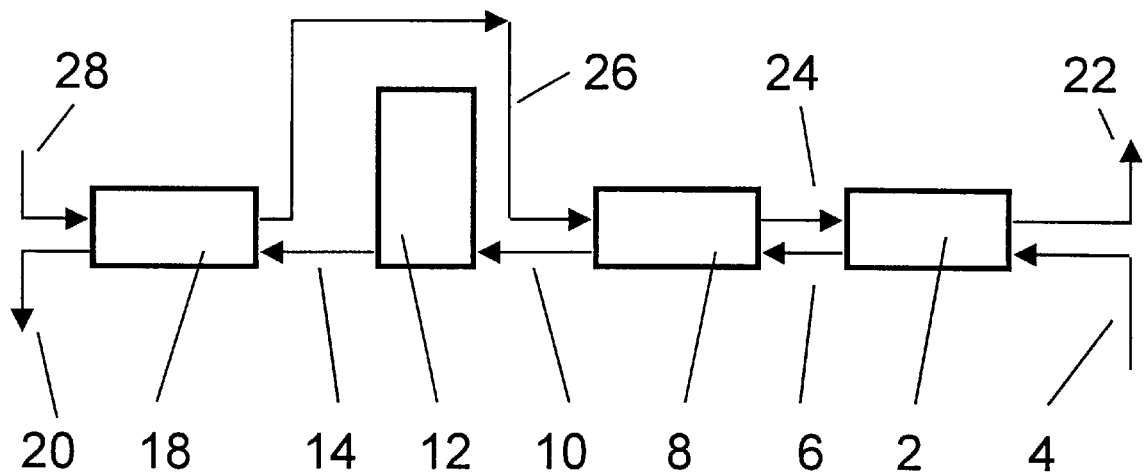
FIG. 1 is a schematic flow diagram of an extraction and hydrolysis process having a single input for extraction liquid.

In this specification, the following terms have the following meanings:

"monosaccharide" means a carbohydrate which cannot be hydrolyzed to a simpler carbohydrate.

"oligosaccharide" means a polymerized saccharide having 2 to 6 monosaccharide units in the chain.

"polysaccharide" means a polymerized saccharide having more than 6 monosaccharide units in the chain.

"weighted molecular weight" is the mean in weight of the individual molecular weights of carbohydrate molecules separated by size exclusion chromatography.

"polydispersity" means the dispersion of the molecular weight distribution of carbohydrate molecules and corresponds to the ratio of the average molecular weight in weight to the average molecular weight in number of carbohydrate molecules separated by size exclusion chromatography.

To produce the soluble coffee product, roast and ground coffee is subjected to at least a four stage, counter-current extraction and hydrolysis process. In a first extraction stage, fresh roast and ground coffee is extracted under relatively mild conditions in which little or no hydrolysis of the coffee solids takes place. Therefore, in this stage, the temperature of the extraction liquid is in the range of about 80° C. to about 160° C.

The partially extracted grounds obtained from the first extraction stage are then subjected to extraction in a second extraction stage. In this stage, the temperature of the extraction liquid is in the range of about 160° C. to about 190° C. so that moderate hydrolysis of the coffee solids may take place.

The partially extracted grounds obtained from the second extraction stage must have at least about 25% by weight of coffee solids, on the basis of dry roast and ground coffee, to be extracted from them. If less than about 25% by weight of coffee solids have been extracted, it is found that the soluble coffee product ultimately produced is sensitive to humidity and temperature. It is believed that this is caused by over-hydrolysis of heat sensitive substances. If more than about 25% by weight of coffee solids have been removed, most or all heat sensitive substances are removed.

The partially extracted grounds are first drained to remove a majority of extraction liquid from them to avoid hydrolysis of the soluble coffee solid the liquid contains. The drained grounds are then subjected to hydrolysis in a separate hydrolysis stage. In this stage, the partially extracted grounds are heated to a temperature of from about 160° C. to about 220° C. for a time of about 1 minute to about 15 minutes.

The hydrolyzed coffee grounds obtained from the hydrolysis stage are then subjected to extraction in a third extraction stage. In this stage, the temperature of the extraction liquid is in the range of about 170° C. to about 190° C. so that moderate hydrolysis of the coffee solids may take place.

The conditions in the hydrolysis stage and the third extraction stage are selected so that the soluble coffee solids in the tertiary extraction liquid leaving the third extraction stage contain less than about 1% by weight furfural derivatives, between about 1% and about 6% by weight monosaccharides and more than about 30% by weight of oligo- and poly-saccharides. All percentages being based upon the dry matter of the hydrolyzed coffee extract. Further, the weighted average molecular weight of all saccharides in the extract is higher than about 1500 units with a polydispersity of about 2.5 or higher.

If desired, the coffee extract leaving the second and/or the third extraction stage may be subjected to flashing to remove off-flavors. Further, if desired, more than one flashing stage may be incorporated into the process; such as described in U.S. Pat. No. 5,183,676 (Schlecht); the disclosure of which is incorporated by reference.

It is also possible to use one or more inputs of hot extraction liquid into the system. If a single input is used, the extraction liquid flows through all of the extraction stages and leaves the first extraction stage as the primary coffee extract. If more than one input is used, more than one coffee extract leaves the system. For example, each extraction stage may have its own input of fresh extraction liquid and its own output of coffee extract.

The extraction stages each may be made up of one or more extraction vessels which may be any suitable extraction vessels; for example fixed bed reactors or continuous counter-current extractors. The choice and design of the vessels is a matter of preference and has no critical impact on the process. Further, if fixed bed reactors are used, the extraction liquid may be caused to flow upward through the reactor or downward through the reactor, as desired. The hydrolysis stage also may be made up of one or more reaction vessels. The hydrolysis reaction vessel may be a fixed bed reactor, an autoclave, a plug flow reactor, an extruder, or the like. Again the design of the hydrolysis reaction vessel is a matter of choice and has no critical impact on the process. However, the extraction reaction vessels and the hydrolysis reaction vessels are conveniently fixed bed reactors and are identical. This has the advantage that the coffee grounds may remain in the same reaction vessel throughout the process.

The extracts obtained from the process may be processed as desired into soluble coffee powder. Usually, the extracts are stripped using steam to remove aroma volatiles, concentrated, and then spray- or freeze-dried. These procedures are well known, are well described in the literature, and have no critical impact on the invention. Aroma may also be recovered from the roast and ground coffee prior to any extraction by any well known procedure like gas stripping, steaming and the like.

Further, the process may include one or more additional hydrolysis and extraction stages to further extract soluble coffee solids from the extract coffee grounds leaving the third extraction stage. These additional hydrolysis and extraction stages may conveniently operate at the same conditions as the hydrolysis stage and the third extraction stage.

In a first specific embodiment illustrated in FIG. 1, fresh roast and ground coffee 4 is introduced into a first extraction stage 2. A secondary coffee extract 24, leaving a second extraction stage 8, is introduced into the first extraction stage 2 to extract soluble coffee solids from the roast and ground coffee in the first extraction stage 2. The introduced coffee extract, including soluble coffee solids extracted in the first extraction stage 2, leaves as an output coffee extract 22. The output coffee extract 22 is then subjected to further processing to convert it into a concentrated coffee extract. The temperature of the secondary coffee extract 24 is conveniently in the range of 80° C. to 160° C. such that substantially no hydrolysis of coffee solids takes place in the first extraction stage 2.

The partially extracted coffee grounds 6 leaving the first extraction stage 4 are transferred to a second extraction stage 8. A tertiary coffee extract 26, leaving a third extraction stage 18, is introduced into the second extraction stage 8 to extract soluble coffee solids from the partially extracted roast and ground coffee in the second extraction stage 2. The introduced coffee extract, including soluble coffee solids extracted in the second extraction stage 8, leaves as the secondary coffee extract 24. The temperature of the tertiary coffee extract 26 is conveniently in the range of about 160° C. to about 190° C. such that moderate hydrolysis of coffee solids takes place in the second extraction stage 8.

The partially extracted coffee grounds 10 leaving the second extraction stage 8 are transferred to a separate hydrolysis stage 12. At this stage, at least 25% by weight, based on dry roast and ground coffee, of soluble coffee solids are removed from the roast and ground coffee. In the hydrolysis stage 12, the partially extracted coffee grounds are drained and then heated to a temperature of from about 160° C. to about 220° C. This may be accomplished in many ways. Conveniently however, the partially extracted coffee grounds are drained by forcing steam through them and are heated by injecting steam at a temperature of 160° C. to 220° C. directly into the reaction vessel which contains the partially extracted coffee grounds. If heated in this way, the heating is extremely rapid. However any suitable heating method may be used.

The hydrolyzed coffee grounds 14 leaving the hydrolysis stage 12 are transferred to the third extraction stage 18. Hot water 28, at a temperature of about 170° C. to about 195° C., is introduced into the third extraction stage 18 to extract any remaining soluble coffee solids from the hydrolyzed coffee grounds. The temperature of the hot water is such that moderate hydrolysis of coffee solids takes place in the third extraction stage 18. The extracted coffee grounds 20 leaving the third extraction stage advantageously have about 50 to about 70% by weight, based on dry roast and ground coffee, of soluble coffee solids extracted from them.

Figure 2:
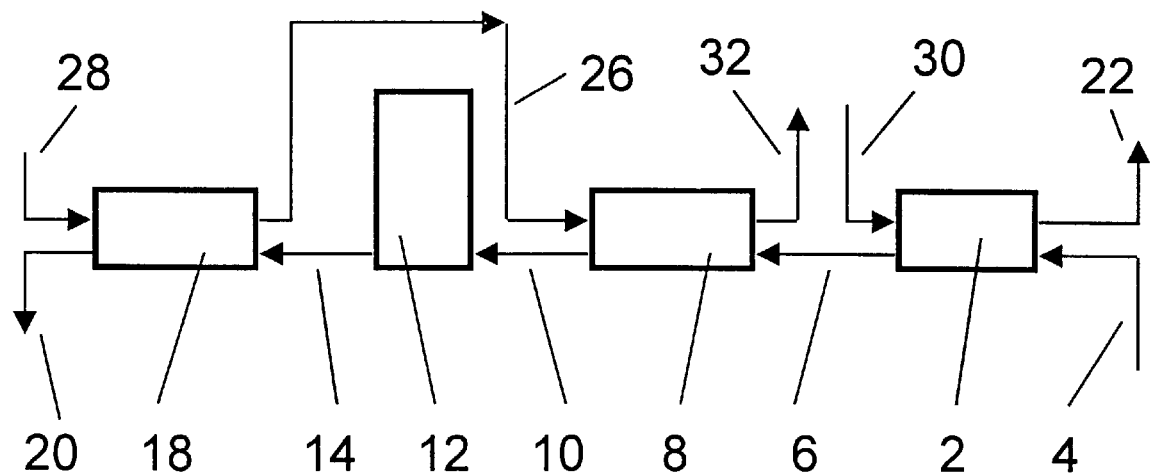
FIG. 2 is a schematic flow diagram of an extraction and hydrolysis process having two inputs for extraction liquid.

Another embodiment is illustrated in FIG. 2. In FIG. 2, the same reference numerals as used in FIG. 1, are used for the same items. In this embodiment, fresh roast and ground coffee 4 is introduced into a first extraction stage 2. Hot water 30, at a temperature of about 80° C. to about 160° C. is introduced into the first extraction stage 2 to extract soluble coffee solids from the roast and ground coffee in the first extraction stage 2. The temperature of the hot water 30 is such that substantially no hydrolysis of coffee solids takes place in the first extraction stage 2. The coffee extract produced in the first extraction stage 2 leaves as an output coffee extract 22.

The partially extracted coffee grounds 6 leaving the first extraction stage 4 are transferred to a second extraction stage 8. A tertiary coffee extract 26, leaving a third extraction stage 18, is introduced into the second extraction stage 8 to extract soluble coffee solids from the partially extracted roast and ground coffee in the second extraction stage 2. The introduced coffee extract, including soluble coffee solids extracted in the second extraction stage 8, leaves as a secondary coffee extract 32. The temperature of the tertiary coffee extract is conveniently in the range of about 160° C. to about 190° C. such that moderate hydrolysis of coffee solids takes place in the second extraction stage 8.

The secondary coffee extract 32 and the output coffee extract 22 may be separately processed as described in U.S. Pat. No. 5,242,700 (Schlecht), the disclosure of which is incorporated by reference. Alternatively, the secondary coffee extract 32 may be combined with the output coffee extract 22 and then subjected to further processing to convert it into a concentrated coffee extract. The partially extracted coffee grounds 10 leaving the second extraction stage 8 are transferred to a separate hydrolysis stage 12 and processed as described above with reference to FIG. 1. Thereafter, the hydrolyzed coffee grounds 14 leaving the hydrolysis stage 12 are transferred to the third extraction stage 18 and processed as described above with reference to FIG. 1. The extracted coffee grounds 20 leaving the third extraction stage have about 45% to about 70% by weight, based on dry roast and ground coffee, of soluble coffee solids extracted from them.

Figure 3:
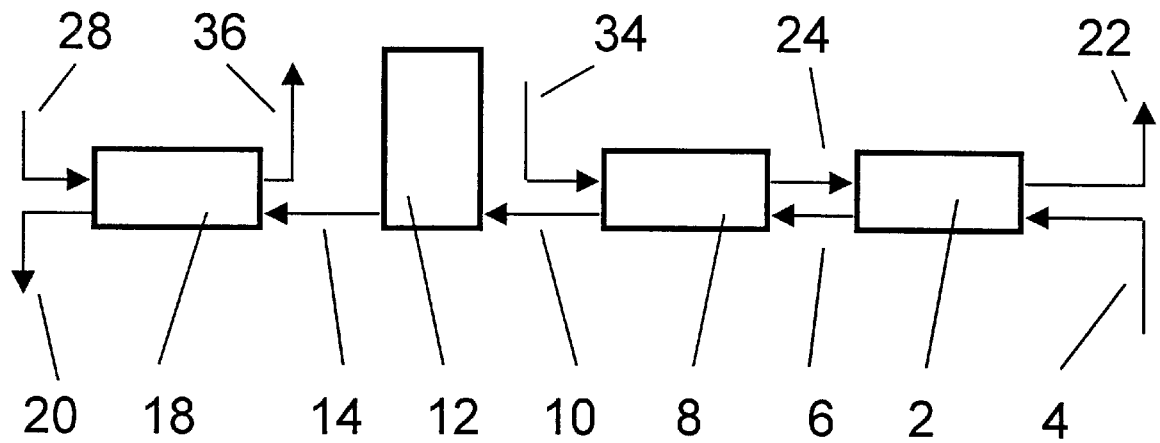
FIG. 3 is a schematic flow diagram of another extraction and hydrolysis process having two inputs for extraction liquid.

A further embodiment is illustrated in FIG. 3. In FIG. 3, the same reference numerals as used in FIG. 1, are used for the same items. In this embodiment, fresh roast and ground coffee 4 is introduced into a first extraction stage 2. A secondary coffee extract 24, leaving a second extraction stage 8, is introduced into the first extraction stage 2 to extract soluble coffee solids from the roast and ground coffee in the first extraction stage 2. The introduced coffee extract, including soluble coffee solids extracted in the first extraction stage 2, leaves as an output coffee extract 22. The temperature of the secondary coffee extract 24 is conveniently in the range of 80° C. to 160° C. such that substantially no hydrolysis of coffee solids takes place in the first extraction stage 2.

The partially extracted coffee grounds 6 leaving the first extraction stage 4 are transferred to a second extraction stage 8. Hot water 34 is introduced into the second extraction stage 8 to extract soluble coffee solids from the partially extracted roast and ground coffee in the second extraction stage 2. The temperature of the hot water 34 is conveniently in the range of about 160° C. to about 190° C. such that moderate hydrolysis of coffee solids takes place in the second extraction stage 8. The hot water and soluble coffee solids extracted in the second extraction stage 8 leaves as the secondary coffee extract 24.

The partially extracted coffee grounds 10 leaving the second extraction stage 8 are transferred to a separate hydrolysis stage 12 and treated as described above with reference to FIG. 1. The hydrolyzed grounds are then transferred to the third extraction stage. Hot water 28, at a temperature of about 170° C. to about 195° C., is introduced into the third extraction stage 18 to extract any remaining soluble coffee solids from the hydrolyzed coffee grounds. The temperature of the hot water is such that moderate hydrolysis of coffee solids takes place in the third extraction stage 18. The hot water and soluble coffee solids extracted in the third extraction stage 18 leaves as the tertiary coffee output 36.

The extracted coffee grounds 20 leaving the third extraction stage also have about 45 to about 70% by weight, based on dry roast and ground coffee, of soluble coffee solids extracted from them. The tertiary coffee output 36 and the output coffee extract 22 may be separately processed as described in U.S. Pat. No. 5,242,700 (Schlecht). Alternatively, the tertiary coffee output 36 may be combined with the output coffee extract 22 and then subjected to further processing to convert it into a concentrated coffee extract.

Figure 4:
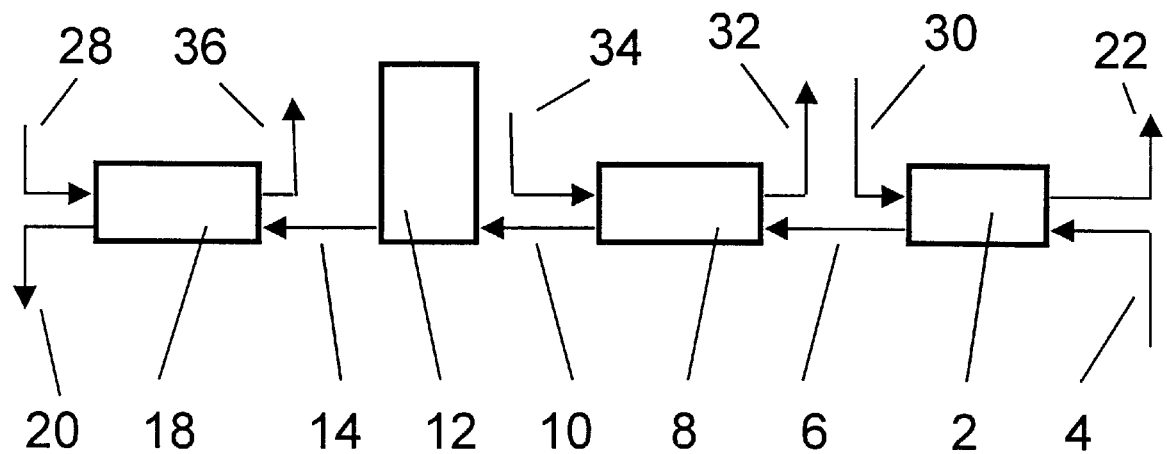
FIG. 4 is a schematic flow diagram of an extraction and hydrolysis process having three inputs for extraction liquid.

A yet further embodiment is illustrated in FIG. 4. In FIG. 4, the same reference numerals as used in FIGS. 1 to 3, are used for the same items. In this embodiment, fresh roast and ground coffee 4 is introduced into a first extraction stage 2. Hot water 30, at a temperature of about 80° C. to about 160° C., is introduced into the first extraction stage 2 to extract soluble coffee solids from the roast and ground coffee in the first extraction stage 2. The temperature of the hot water 30 is such that substantially no hydrolysis of coffee solids takes place in the first extraction stage 2. The coffee extract produced in the first extraction stage 2 leaves as an output coffee extract 22.

The partially extracted coffee grounds 6 leaving the first extraction stage 4 are transferred to a second extraction stage 8. Hot water 34 is introduced into the second extraction stage 8 to extract soluble coffee solids from the partially extracted roast and ground coffee in the second extraction stage 2. The temperature of the hot water 34 is conveniently in the range of about 160° C. to about 190° C. such that moderate hydrolysis of coffee solids takes place in the second extraction stage 8. The hot water and soluble coffee solids extracted in the second extraction stage 8 leaves as the secondary coffee output 32.

The partially extracted coffee grounds 10 leaving the second extraction stage 8 are transferred to a separate hydrolysis stage 12 and treated as described above with reference to FIG. 1. The hydrolyzed grounds are then transferred to the third extraction stage. Hot water 28, at a temperature of about 170° C. to about 195° C., is introduced into the third extraction stage 18 to extract any remaining soluble coffee solids from the hydrolyzed coffee grounds. The temperature of the hot water is such that moderate hydrolysis of coffee solids takes place in the third extraction stage 18. The hot water and soluble coffee solids extracted in the third extraction stage 18 leaves as the tertiary coffee output 36.

The extracted coffee grounds 20 leaving the third extraction stage also have about 45 to about 70% by weight, based on dry roast and ground coffee, of soluble coffee solids extracted from them. The secondary coffee output 32, the tertiary coffee output 36 and the output coffee extract 22 may be separately processed as described in U.S. Pat. No. 5,242,700 or may be combined in various options and then subjected to further processing.

It is found that little or no insolubles or tars are formed during the process which would otherwise be causing fouling problems during the further processing steps. Also, little or no hygroscopic fractions which are difficult to dry and complicate spray- or freeze-drying are present.

In all cases, the soluble coffee product which is ultimately obtained contains less than 1% by weight of furfural derivatives, less than about 4% by weight of monosaccharides, less than about 12% by weight of oligosaccharides, and at least about 18% by weight of polysaccharides. The total amount of saccharides present is at least about 30% by weight. All percentages are based upon the dry weight of the soluble coffee product. Further the weighted average molecular weight of the saccharides is greater than about 2000 units with a polydispersity of about 3 or above. Such a soluble coffee product has an good coffee aroma and flavor profile. Also there are sufficient low amounts of small saccharides and high amounts of larger saccharides to result in a powder stable upon storage even under tropical conditions.

EXAMPLE 1

An extraction system made up of 7 fixed bed reactors is used. The reactors are connected in series such that roast and ground coffee entering the system begins at the first reactor (reactor 1) and progresses to the last reactor (reactor 7). Reactors 1 and 2 form a first extraction stage, reactors 3 and 4 form a second extraction stage, reactor 5 forms a hydrolysis stage, and reactors 6 and 7 form a third extraction stage.

The reactors are also connected such that extraction liquid enters the extraction system at reactor 7 and flows through reactors 6, 4, 3, 2 and 1 in that order to leave the system at reactor 1. The extraction liquid does not flow through reactor 5.

Lightly roasted Robusta beans are ground and fed into reactor 1. Hot water at a temperature of 180° C. is fed into reactor 7. The mass ratio of coffee extract leaving reactor 1 to ground coffee in reactor 1 is about 5:1. The extraction liquid leaving reactor 6 and entering reactor 4 is at a temperature of about 170° C. The extraction liquid leaving reactor 3 is flashed to remove off flavors and is introduced into reactor 2 at a temperature of about 130° C.

Net extraction yield of the grounds after reactor 4 is about 40% by weight of initial dry roast and ground coffee. The partially extracted grounds in reactor 5 are first drained and then steam is introduced into the reactor to raise the temperature to about 198° C. for about 6 minutes. The hydrolysis is terminated by rapidly reducing the pressure below 800 kPa to lower the temperature to below 170° C. Extraction yield in reactors 6 and 7 is about 19% by weight, taking the total extraction yield to about 59% by weight of initial dry roast and ground coffee.

The coffee extract leaving reactor 1 is subjected to steam stripping, evaporation, and drying to produce soluble coffee powder in a conventional manner. The evaporated extract is freeze-dried or spray-dried. No problems arise during processing which would indicate that no tars formed during extraction and hydrolysis.

The soluble coffee powder is analyzed for saccharide content and is made up of about 32% saccharides. The saccharides are made up of about 0.5% furfural derivative, about 3.5% monosaccharides, about 10% oligosaccharides; and 21% polysaccharides. All percentages are by weight on a dry basis of soluble coffee powder. The weight average molecular weight of the saccharides is 2500 units with a polydispersity of about 4.3.

A teaspoon of the soluble coffee powder is dissolved in 150 ml of simmering water. A panel of tasters taste the beverage and determine it to have a good coffee flavor with a smooth, acid and juicy taste. An attenuation of the harshness is also perceived.

Figure 5:
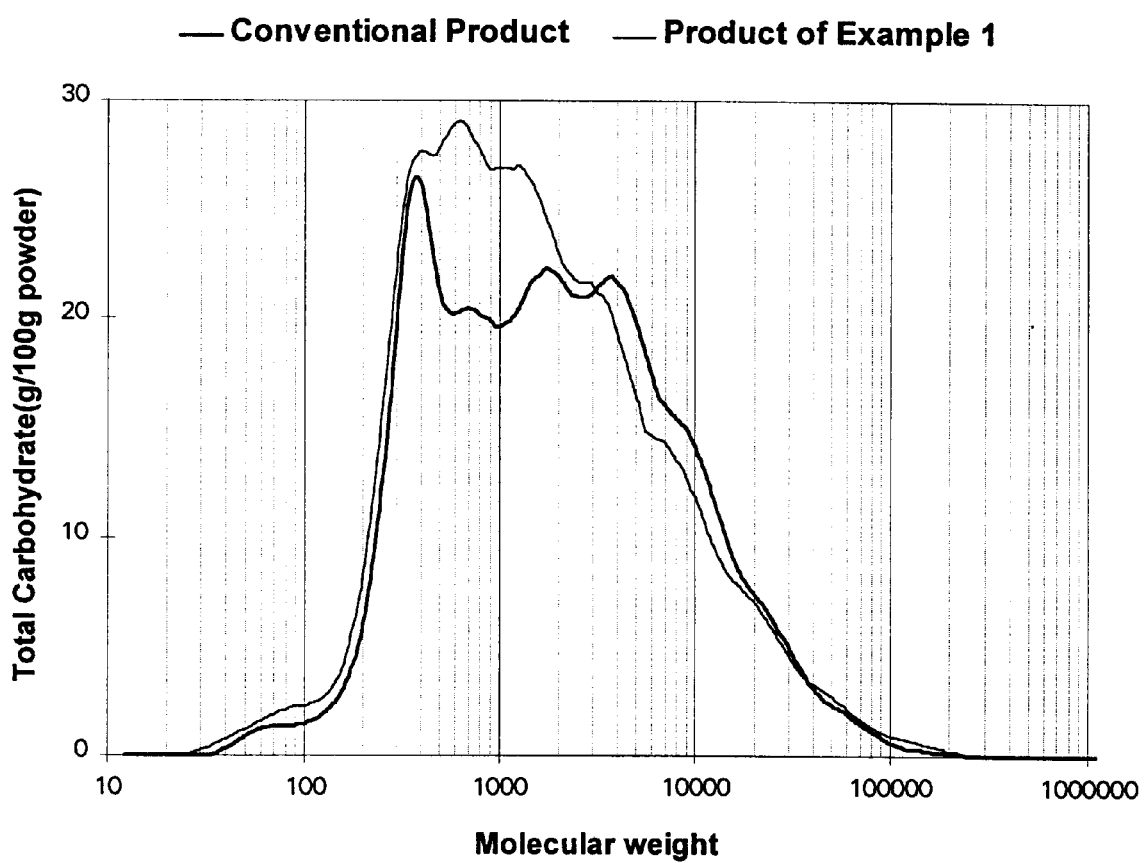
FIG. 5 is a graph of the molecular weight distribution of saccharides against total weight of carbohydrate for soluble coffee products produced by conventional extraction processes and the process of example 1.

The molecular weight distributions for a conventional soluble coffee powder produced by a conventional extraction process, which involves little or no hydrolysis, and the soluble coffee powder of this example, are illustrated in FIG. 5. The distributions compare very well; particularly at molecular weights above about 2000. Usually, soluble coffee powders produced from coffee extracts having hydrolyzed coffee solids have a sharp peak at lower molecular weights but contain much less saccharide at molecular weights of above about 3000.

EXAMPLE 2

The process of example 1 is repeated except darkly roasted Milds are ground and fed into reactor 1. Also, in reactor 5, the grounds are heated to 192° C. for about 2 minutes.

Net extraction yield on the grounds after reactor 4 is about 30.5% by weight on dry R&G coffee. Extraction yield over reactors 5 to 7 is about 20% by weight, taking the total extraction yield to about 50.5% by weight of dry roast and ground coffee.

The soluble coffee powder is analyzed for saccharide content and is made up of about 34% saccharides. The saccharides are made up of about 0.4% furfural derivative, about 2% monosaccharides, about 7.5% oligosaccharides; and 24% polysaccharides. All percentages are by weight on a dry basis of soluble coffee powder. The weight average molecular weight of the saccharides is 2400 units with a polydispersity of about 3.8.

A teaspoon of the soluble coffee powder is dissolved in 150 ml of simmering water. A panel of tasters taste the beverage and determine it to have a good coffee flavor with a smooth, acid and juicy taste. An attenuation of the harshness is also perceived.

EXAMPLE 3

The extraction system of example 1 is used except that the reactors are connected such that extraction liquid enters the extraction system at reactor 7 and flows through reactors 6, 4, 3 in that order and leaves the system after reactor 3. Fresh extraction liquid is introduced into reactor 2 and leaves the system at reactor 1. Therefore the extraction system has two inputs of extraction liquid.

A darkly roasted mixture made up of 80% Milds and 20% Robusta beans are ground and fed into reactor 1. Hot water at a temperature of 140° C. is fed into reactor 2. The mass ratio of extract leaving reactor 1 to ground coffee is about 4.5:1. Net extraction yield over extraction stage 1 is about 29% by weight on a dry basis.

Hot water at 180° C. is fed into reactor 7. The mass ratio of coffee extract leaving reactor 3 to ground coffee in reactor 1 is about 5:1. The extraction liquid leaving reactor 6 and entering reactor 4 is at a temperature of about 170° C. The extraction liquid leaving reactor 3 is flashed to remove off flavors.

The partially extracted grounds in reactor 5 are first drained and then steam is introduced into the reactor to raise the temperature to about 195° C. for about 4 minutes. The hydrolysis is terminated by rapidly reducing the pressure below 800 kPa to lower the temperature to below 170° C. Extraction yield for reactors 3 to 7 is about 21% by weight taking the total extraction yield to about 50% by weight of dry roast and ground coffee.

The coffee extracts leaving reactor 1 and reactor 3 are separately processed to soluble coffee powder as described in U.S. Pat. No. 5,242,700 (Schlecht). No problems arise during processing which would indicate that no tars formed during extraction and hydrolysis.

The soluble coffee powder is analyzed for saccharide content and is about the same as that of example 1. Total carbohydrate content is 35% with 0.6% of furfural derivatives, 3.5% of monosaccharides, 7% of oligosaccharides and 25% of polysaccharides. A teaspoon of the soluble coffee powder is dissolved in 150 ml of simmering water. A panel of tasters taste the beverage and determine it to have a good flavor with a smooth, acid and juicy taste. An attenuation of the harshness is also perceived.

EXAMPLE 4

The extraction system of example 1 is used except that 10 reactors are used. The reactors are connected such that a first input of extraction liquid enters the extraction system at reactor 10 and flows through reactors 10 and 9 and leaves the system after reactor 9, while a second input of extraction liquid enters the extraction system at reactor 7 and flows through reactors 7, 6, 4, 3, 2 and 1 and leaves the system after reactor 1. Therefore the extraction system has two inputs of extraction liquid.

A medium roasted mixture made up of 80% Milds and 20% Robusta beans are ground and fed into reactor 1. The extraction in reactors 1 to 7 is carried out as described in example 1. The partially extracted grounds in reactor 5 are drained and then hydrolyzed at 195° C. using saturated steam for 4 minutes. Hydrolysis is quenched by rapidly reducing the pressure below 800 kPa to lower the temperature below 170° C. Net extraction yield over reactors 1 to 7 is about 52% by weight of initial dry roast and ground coffee.

The partially extracted grounds in reactor 8 are first drained and processed as described in example 1 using saturated steam at a temperature of 198° C. for about 6 minutes. Hot water at 180° C. is fed into reactor 10 and the hydrolyzed grounds in reactors 10 and 9 are extracted. The mass ratio of coffee extract leaving reactor 9 to ground coffee in reactor 1 is about 4:1. Net extraction yield over reactors 8 to 10 is about 5% by weight on dry roast and ground coffee, taking the total extraction yield to about 57% of initial dry roast and ground coffee.

The two extracts obtained from the system are mixed and processed together to soluble coffee powder without problem, indicating little or no tar formation. Beverages produced from the soluble coffee powder have no off-flavors.

The soluble coffee powder is analyzed for saccharide content and is made up of about 39% saccharides. The saccharides are made up of about 0.2% of furfural derivatives, about 4% of monosaccharides, about 6% of oligosaccharides; and 29% of polysaccharides. All percentages are given by weight on a dry basis of soluble coffee powder. The weight average molecular weight of the saccharides is 5000 units with a polydispersity of about 4.3.

A teaspoon of the soluble coffee powder is dissolved in 150 ml of simmering water. A panel of tasters taste the beverage and determine it to have a good coffee flavor with no processy notes, and a smooth, acid and juicy taste. An attenuation of the harshness is also perceived.

We claim:

1. A process for counter current extraction of soluble coffee solids from coffee grounds, the process comprising:
    extracting soluble coffee solids from fresh grounds in a first extraction stage using a primary extraction liquid at a temperature of about 80° C. to about 160° C. to provide a primary coffee extract and partially extracted grounds;
    extracting soluble coffee solids from the partially extracted grounds in a second extraction stage using a secondary extraction liquid at a temperature of about 160° C. to about 190° C. to provide a secondary coffee extract and coffee grounds, the coffee grounds having at least about 25% by weight of soluble coffee solids extracted from them based on the weight of dry roast and ground coffee, the secondary coffee extract being collected or being used as the primary extraction liquid;
    draining liquid from the coffee grounds obtained from the second extraction stage and thermally hydrolyzing the coffee grounds using steam in a hydrolysis stage at a temperature of about 160° C. to about 220° C. for about 1 to about 15 minutes to provide hydrolyzed coffee grounds; and
    extracting soluble coffee solids from the hydrolyzed coffee grounds in a third extraction stage using a tertiary extraction liquid at a temperature of about 170° C. to about 195° C. to provide extracted coffee grounds and a hydrolyzed coffee extract, the hydrolyzed coffee extract being collected or being used as the primary or secondary extraction liquid.

2. A process according to claim 1 in which the primary extraction liquid enters the first extraction stage at a temperature in the range of about 110° C. to about 140° C.

3. A process according to claim 1 in which the secondary extraction liquid enters the second extraction stage at a temperature in the range of about 165° C. to about 180° C.

4. A process according to claim 1 in which the tertiary extraction liquid enters the third extraction stage at a temperature in the range of about 175° C. to about 190° C.

5. A process according to claim 1 in which, in the hydrolysis stage, the coffee grounds are thermally hydrolyzed at a temperature of about 190° C. to about 210° C.

6. A process according to claim 1 in which the coffee grounds are drained by forcing steam downwardly through them and are thermally hydrolyzed by heating using steam.

7. A process according to claim 1 in which the hydrolyzed coffee extract leaving the third extraction stage contains less than about 1% by weight furfural derivatives, about 1% to about 6% by weight monosaccharides and more than about 28% by weight of oligosaccharides and polysaccharides; all percentages being based upon the dry matter of the hydrolyzed coffee extract.

8. A process according to claim 7 in which the weighted average molecular weight of all saccharides in the hydrolyzed coffee extract is higher than about 1500 units with a polydispersity of about 2.5 or higher.

9. A process according to claim 1 further comprising:
    draining the coffee grounds obtained from the third extraction stage and thermally hydrolyzing them in a second hydrolysis stage at a temperature of about 160° C. to about 220° C. for about 1 to about 15 minutes to provide secondary hydrolyzed coffee grounds; and
    extracting soluble coffee solids from the secondary hydrolyzed coffee grounds in a fourth extraction stage using a fourth extraction liquid at a temperature of about 170° C. to about 195° C. to provide extracted coffee grounds and a second hydrolyzed coffee extract, the second hydrolyzed coffee extract being collected or being used as the primary, secondary or tertiary extraction liquid.

10. A process for counter-current extraction of soluble coffee solids from coffee grounds, the process comprising:
    extracting soluble coffee grounds in a first extraction stage using a primary extraction liquid at a temperature of about 80° C. to about 160° C. to provide a primary coffee extract and partially extracted grounds;
    extracting soluble coffee solids from the partially extracted grounds in a second extraction stage using a secondary extraction liquid at a temperature of about 160° C. to about 190° C. to provide a secondary coffee extract and coffee grounds, the coffee grounds having at least about 25% by weight of soluble coffee solids extracted from them based on the weight of dry roast and ground coffee, the secondary coffee extract forming the primary extraction liquid;
    draining liquid from the coffee grounds obtained from the second extraction stage and thermally hydrolyzing the coffee grounds using steam in a hydrolysis stage at a temperature of about 160° C. to about 220° C. for about 1 to about 15 minutes to provide hydrolyzed coffee grounds; and
    extracting soluble coffee solids from the hydrolyzed coffee grounds in a third extraction stage using a tertiary extraction liquid at a temperature of about 170° C. to about 195° C. to provide extracted coffee grounds and a hydrolyzed coffee extract, the hydrolyzed coffee extract being collected or forming the secondary extraction liquid.

11. A process according to claim 10 in which the primary extraction liquid enters the first extraction stage at a temperature in the range of about 110° C. to about 140° C.

12. A process according to claim 10 in which the secondary extraction liquid enters the second extraction stage at a temperature in the range of about 165° C. to about 180° C.

13. A process according to claim 10 in which the tertiary extraction liquid enters the third extraction stage at a temperature in the range of about 175° C. to about 190° C.

14. A process according to claim 10 in which, in the hydrolysis stage, the coffee grounds are thermally hydrolyzed at a temperature of about 190° C. to about 210° C.

15. A process according to claim 10 in which the coffee grounds are drained by forcing steam downwardly through them and are thermally hydrolyzed by heating using steam.

16. A process according to claim 10 in which the hydrolyzed coffee extract leaving the third extraction stage contains less than about 1% by weight furfural derivatives, about 1% to about 6% by weight monosaccharides and more than about 28% by weight of oligosaccharides and polysaccharides; all percentages being based upon the dry matter of the hydrolyzed coffee extract.

17. A process according to claim 16 in which the weighted average molecular weight of all saccharides in the hydrolyzed coffee extract is higher than about 1500 units with a polydispersity of about 2.5 or higher.

18. A process according to claim 10 further comprising:
draining the coffee grounds obtained from the third extraction stage and thermally hydrolyzing them in a second hydrolysis stage at a temperature of about 160° C. to about 220° C. for about 1 to about 15 minutes to provide secondary hydrolyzed coffee grounds; and
extracting soluble coffee solids from the secondary hydrolyzed coffee grounds in a fourth extraction stage using a fourth extraction liquid at a temperature of about 170° C. to about 195° C. to provide extracted coffee grounds and a second hydrolyzed coffee extract, the second hydrolyzed coffee extract being collected or being used as the primary, secondary or tertiary extraction liquid.

* * * * *